(No Model.)
S. SNELL.
ANIMAL TRAP.
No. 344,551. Patented June 29, 1886.
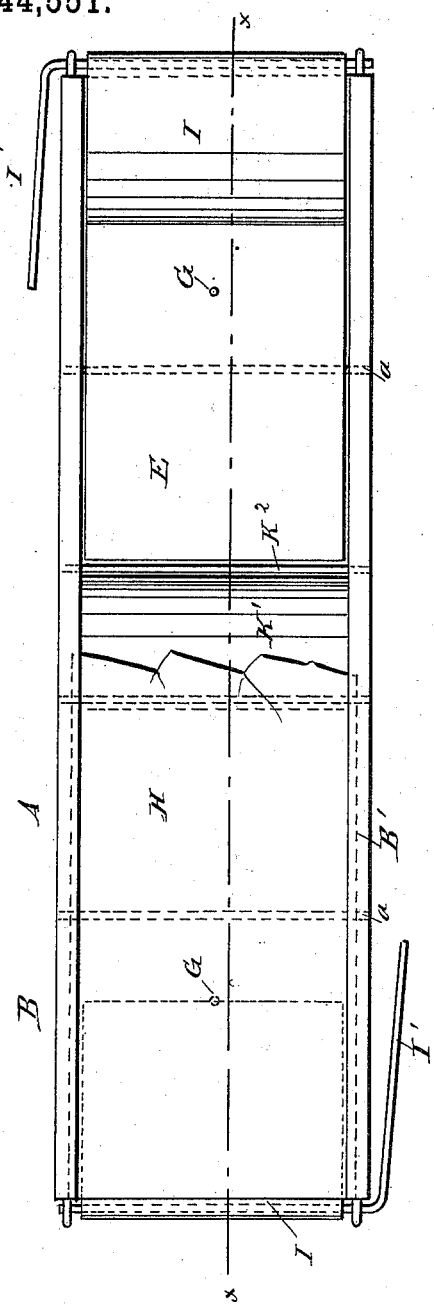
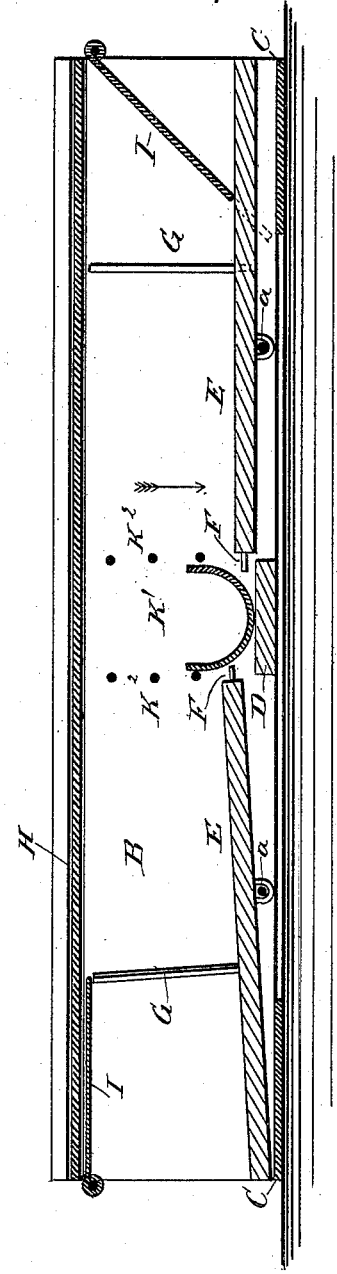
WITNESSES:
INVENTOR:
S. Snell
BY Munn & Co
ATTORNEYS.

UNITED STATES PATENT OFFICE.

SYLVESTER SNELL, OF WATERTOWN, NEW YORK.

ANIMAL-TRAP.

SPECIFICATION forming part of Letters Patent No. 344,551, dated June 29, 1886.

Application filed January 16, 1886. Serial No. 188,804. (No model.)

*To all whom it may concern:*

Be it known that I, SYLVESTER SNELL, of Watertown, in the county of Jefferson and State of New York, have invented a new and Improved Animal-Trap, of which the following is a full, clear, and exact description.

The object of my invention is to provide a new and improved trap specially adapted to entrap small and even larger animals alive.

The invention consists in various parts and details, and combinations of the same, as will be fully described hereinafter, and then pointed out in the claims.

Reference is to be had to the accompanying drawings, forming a part of this specification, in which similar letters of reference indicate corresponding parts in both the figures.

Figure 1 is a plan view of a double trap with parts of the case removed. Fig. 2 is a longitudinal sectional elevation of the same on the line $x$ $x$, Fig. 1.

My improved animal-trap may be constructed as a single trap or a double one, as illustrated in the drawings, and may be made of various sizes, according to the special purpose for which it is intended.

The box A consists of the side pieces, B and B', connected with each other in front at the bottom by the cross-piece C, and at the center or the rear, if a single trap, by the cross-piece D. The bottom E is pivoted at $a$, near its middle, to the side pieces, B and B', in such a manner that when the trap is not set the front part of the bottom E rests on the cross-piece C of the box A. The inner edge of the bottom is provided with a stop-pin, F, which projects over the edge of the central cross-piece, D. A pin, G, is securely attached on the center line of the bottom E between the pivot $a$ and the front end, the said pin G being at right angles to the bottom and reaching nearly to the cover H, which may be fastened in any convenient manner to the side pieces, B and B', and be made of glass, wood, metal, or other suitable material.

To the front end of the box A, a short distance below the cover H, a door, I, is pivoted, which swings between the sides B and B' and between the cover H and the bottom E of the box.

Above the cross-piece D a receptacle, K, is formed, in which is placed the bait. This receptacle may be constructed in any desired manner; but I prefer the construction shown in Fig. 2, which consists of the trough K', extending between the side pieces, B and B', and resting on the bottom cross-piece, D, and of guard-rails K'', placed suitable distances apart vertically and extending from side to side of the box A.

The swinging door I is provided with a handle, I', which extends from the front of the cover to the outer side of one of the side pieces, B or B'.

The operation is as follows: The trap is set by raising the handle I' of the door I until the inner edge rests on the upright pin G, attached to the bottom E. The latter rests with its front edge on the cross-piece C, so that the animal which is to be entrapped has free access to the interior of the box. As soon as the animal steps over the pivot $a$ on the bottom E, the inner end of the latter is depressed, whereby the upright pin G is swung from under the door I, so that the latter tips downward until it strikes the upper surface of the bottom E, as shown to the left of Fig. 2. It will be seen that the animal is entrapped before it reaches the bait-box K. The pin F in the inner end of the bottom E when down rests on the cross-piece D, so that the animal cannot swing the inner end of the bottom E downward and escape.

I prefer to construct the sides and bottom of my trap of hard wood, the door of metal, and cover of glass; but any other suitable materials may be used.

Having thus fully described my invention, I claim as new and desire to secure by Letters Patent—

1. In an animal-trap, the combination, with a box of suitable construction, of a hinged bottom, the front end of which is heavier than the rear end and is provided with an upwardly-extending pin, and of a swinging door attached to the front end of the box and operated by the pin in the hinged bottom, substantially as shown and described.

2. In an animal-trap, the combination, with a box of suitable construction, to the front upper end of which is pivoted a door, of a hinged bottom, the front end of which is heavier than the rear end and is provided with an upwardly-extending pin in its center line, and of a stop-pin at the inner edge of said bottom, substantially as herein shown and described.

3. In an animal-trap, the box A, consisting of the side pieces, B and B', the cross-pieces C and D, and the cover H, in combination with the pivoted bottom E, provided with the pins F and G, and the pivoted door I, having an outwardly-extending handle, I', substantially as herein shown and described.

4. In an animal-trap, the box A, having the cover H and the bait-box K, in combination with the pivoted bottom E, the upright pin G, and the hinged door I, having a handle, I', substantially as herein shown and described.

5. In an animal-trap, the combination, with a box and a swinging door hinged to the front end of the box, and provided with an outwardly-extending handle, of a pivoted bottom, the front end of which is heavier than the rear end and provided with an upwardly-extending pin which operates the swinging door, substantially as shown and described.

SYLVESTER SNELL.

Witnesses:
THEO. G. HOSTER,
EDGAR TATE.